(12) United States Patent
Tan

(10) Patent No.: US 7,833,007 B2
(45) Date of Patent: Nov. 16, 2010

(54) HOT RUNNER HAVING A HEAT SHRINKABLE TUBE COVERING

(75) Inventor: Zi-Xiong Tan, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 166 days.

(21) Appl. No.: 12/337,738

(22) Filed: Dec. 18, 2008

(65) Prior Publication Data

US 2009/0220635 A1    Sep. 3, 2009

(30) Foreign Application Priority Data

Feb. 29, 2008    (CN)    .................. 2008 1 0300428

(51) Int. Cl.
  *B29C 45/20*    (2006.01)
(52) U.S. Cl. .................................. 425/549; 264/328.15
(58) Field of Classification Search ................ 425/549; 264/328.15
  See application file for complete search history.

(56) References Cited

U.S. PATENT DOCUMENTS 5,820,898 A * 10/1998 Yasuda ..................... 425/542
7,118,703 B2 * 10/2006 Trudeau ..................... 425/549

* cited by examiner

*Primary Examiner*—Tim Heitbrink
(74) *Attorney, Agent, or Firm*—Steven M. Reiss

(57) ABSTRACT

A hot runner (10) is provided including a canal (11) and a heat-shrinkable tube (12) covering on the canal (11). The heat-shrinkable tube (12) can shrink along the canal (12)'s contour when heated. The present invention further provides a mold (20) using the hot runner.

10 Claims, 3 Drawing Sheets

HOT RUNNER HAVING A HEAT SHRINKABLE TUBE COVERING

BACKGROUND

1. Field of the Invention

The present invention generally relates to hot runners and, particularly, to a hot runner used in a mold assembly.

2. Description of Related Art

Insert molding technology using molding machines is a popular molding method. A typical molding machine usually includes a hot runner, a male mold and a female mold. The male mold and the female mold define a mold cavity therebetween. The male mold has a passage defined therein, communicating with the mold cavity. The hot runner is inserted into the passage. Thus, melted plastic can be injected into the mold cavity through the hot runner.

To prevent the melted plastic from leaking out of a combining aperture between the hot runner and the passage, a vertical surface is formed on the outside of the hot runner. The vertical surface is an outer peripheral surface surrounding the longitudinal axis of the hot runner. Correspondingly, the passage has a cooperating surface. The vertical surface is tightly attached to the cooperating surface, thus preventing leakage of melted plastic.

However, after repeated usage, a gap may appear between the vertical surface and the cooperating surface because of abrasion, high temperature, and high pressure. Thus, melted plastic may leak to the outer surface of the hot runner, resulting in damaging other elements, i.e., the heating coil and the temperature-sensing equipment.

Thus, there is room for improvement within the art.

BRIEF DESCRIPTION OF THE DRAWINGS

Many aspects of the hot runner and the mold assembly can be better understood with reference to the following drawings. These drawings are not necessarily drawn to scale, the emphasis instead being placed upon clearly illustrating the principles of the present hot runner and the mold assembly. Moreover, in the drawings like reference numerals designate corresponding parts throughout the several views.

DETAILED DESCRIPTION OF EXEMPLARY EMBODIMENTS

Figure 1:
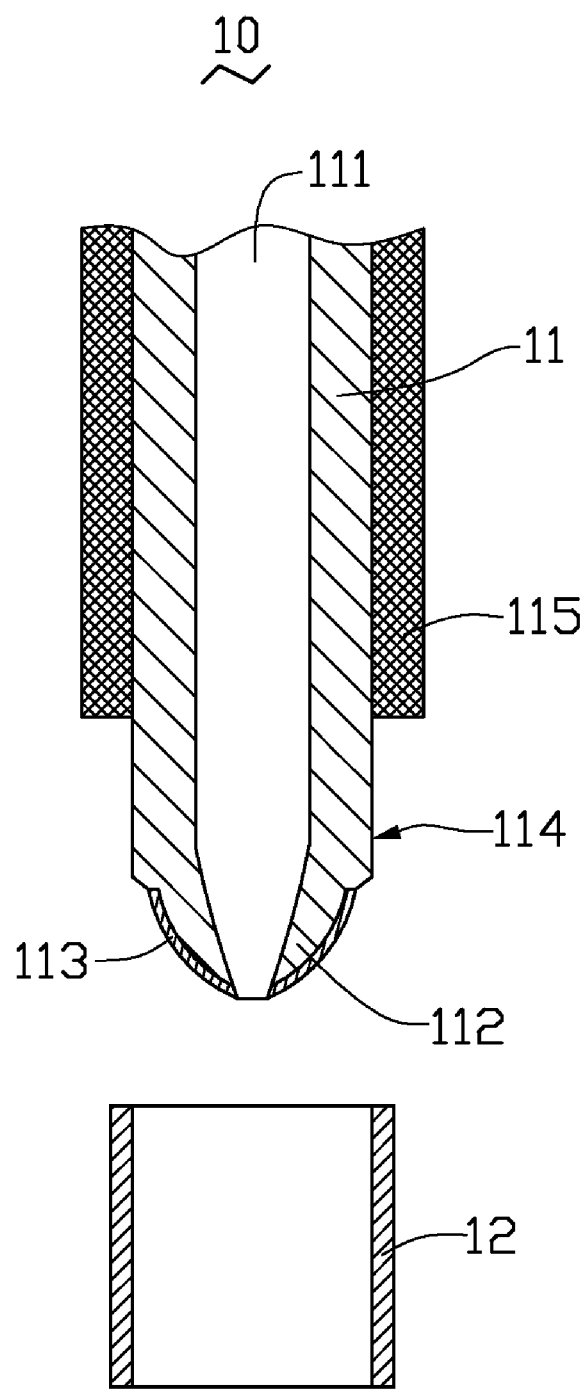
FIG. 1 is a disassembled cross-sectional view of a hot runner, according to an exemplary embodiment.

FIG. 1 shows an exemplary hot runner 10. The hot runner 10 includes a canal 11 and a heat-shrinkable tube 12.

Figure 2:
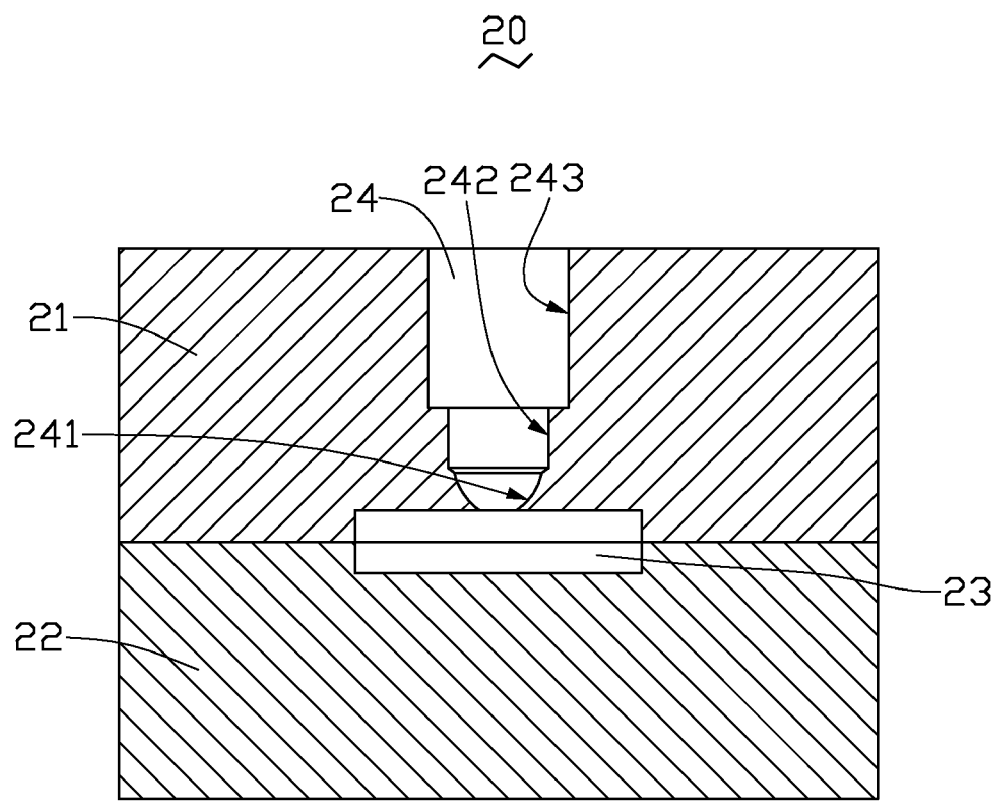
FIG. 2 is a cross-sectional view of a mold assembly.

The canal 11 is a hollow tube. The canal 11 defines a channel 111 in the center portion therethrough, and includes a sprayer 112 disposed at one distal end thereof, and a heat insulating layer 113 attached to and covering an outer periphery of the sprayer 112. The sprayer 112 is tapered. The heat insulating layer 113 is also tapered, and configured to insulate the hot runner 10 and a mold assembly 20 (referring to FIG. 2) for preventing heat transmission from the hot runner 10 to the mold assembly 20. The canal 11 has a vertical surface 114 adjacent to the heat insulating layer 113. The vertical surface 114 is an outer peripheral surface surrounding the longitudinal axis of the hot runner 10, and has a high machining precision. A heater 115 is positioned on the outside of the other end of the canal 11 opposite to the sprayer 112. The heater 115 provides heat to the canal 11 to maintain good flowing of melted plastic in the channel 11.

The heat-shrinkable tube 12 is made of a macromolecular material having different states when at different temperatures, such as polyvinylchlorid (PVC) and etc. At room temperature, the heat-shrinkable tube 12 is in a glass state. At elevated temperatures, the heat-shrinkable tube 12 may shrink and become elastic. When in the glass state, the heat-shrinkable tube 12 has properties similar to plastic. When in the elastic state, the heat-shrinkable tube 12 has properties similar to rubber. Therefore, when heated, the heat-shrinkable tube 12 changes from the glass state to the high-elastic state and automatically shrinks in volume.

Figure 3:
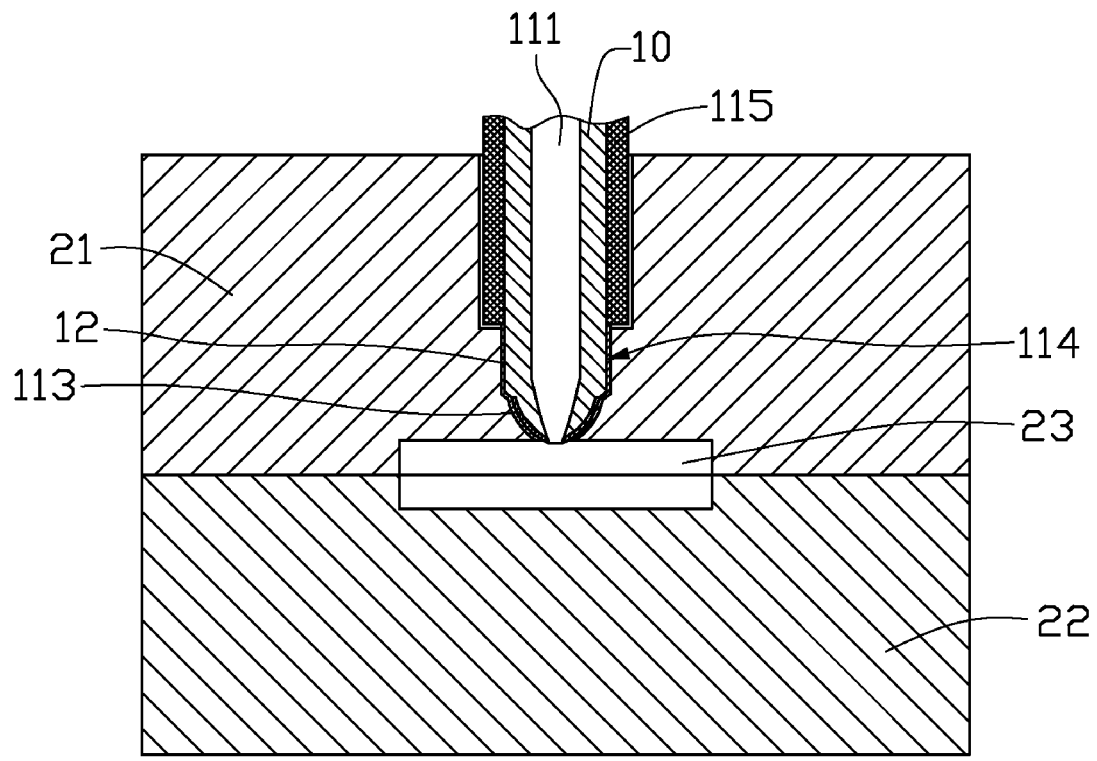
FIG. 3 is a cross-sectional view of the mold assembly engaging with the hot runner.

Referring to FIG. 3, when assembling the hot runner 10, the heat-shrinkable tube 12 covers the vertical surface 114 of the canal 11, and receives the heat insulating layer 113 therein. The heater 115 is then electrified by a power source (not shown) to generate heat, thereby causing the heat-shrinkable tube 12 to shrink and tightly attach to the contour of the heat insulating layer 113 and the vertical surface 114.

Referring to FIG. 2 again, a mold assembly 20 includes a male mold 21 and a female mold 22. The male mold 21 and the female mold 22 cooperatively form a mold cavity 23 therebetween. The male mold 21 defines a passage 24 communicating with the mold cavity 23. The passage 24 is configured for receiving the hot runner 10. The passage 24 has an inner wall, including a tapered surface 241, a cooperating surface 242 and a limiting surface 243.

Referring to FIG. 3 again, when mounting the hot runner 10 to the mold assembly 20, the hot runner 10 is inserted into the passage 24 of the mold assembly 20. The heat-shrinkable tube 12 abuts against the tapered surface 241. The cooperating surface 242 cooperatively engages with the vertical surface 114. A periphery wall of the heater 115 is limited by the limiting surface 243. The heat-shrinkable tube 12 can fill in the gap between the cooperating surface 242 and the vertical surface 114 and the gap between the heat insulating layer 113 and the tapered surface 241, thus preventing leakage of melted plastic.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A hot runner, comprising:
   a canal;
   a heat-shrinkable tube covering the canal;
   wherein, when heated, the heat-shrinkable tube shrinks along the canal's contour and encircling around the canal.

2. The hot runner as claimed in claim 1, wherein the heat-shrinkable tube is made of macromolecular material.

3. A mold assembly, comprising:
   a passage;
   a hot runner, the hot runner including a canal communicating with the passage and a heat-shrinkable tube, when heated, the heat-shrinkable tube shrinks along the canal's contour and encircling around the canal.

4. The mold assembly as claimed in claim 3, wherein the mold assembly includes a male mold and a female mold, the male mold and female mold cooperatively define a mold cavity.

5. The mold assembly as claimed in claim 4, wherein the passage is defined by the male mold and the passage communicates to the mold cavity.

6. The mold assembly as claimed in claim 5, wherein the inside wall of the passage includes a tapered surface, a cooperating surface and a limiting surface.

7. The mold assembly as claimed in claim 6, wherein the canal has a channel therethrough and a sprayer disposed at one end of the canal.

8. The mold assembly as claimed in claim 7, wherein a heat insulating layer encloses an outer periphery of the sprayer, the heat insulating layer inhibiting heat transmission between the hot runner and the mold assembly.

9. The mold assembly as claimed in claim 8, wherein the canal has a vertical surface adjacent to the heat insulating layer.

10. The mold assembly as claimed in claim 9, further comprising a heater disposed towards an end of the canal spaced from the sprayer, the heater is used to maintain the plastic flowing in the melted state.

* * * * *